INVENTOR.
THOMAS G. BROWN
BY Percy P. Lantzy
ATTORNEY

ERROR CORRECTION CIRCUIT FOR DIGITAL RECORDING SYSTEMS

Filed Oct. 21, 1965 Sheet 2 of 2

INVENTOR.
THOMAS G. BROWN
BY Percy P. Lantzy
ATTORNEY 3,430,197
Patented Feb. 25, 1969

3,430,197

ERROR CORRECTION CIRCUIT FOR DIGITAL RECORDING SYSTEMS

Thomas G. Brown, Ridgewood, N.J., assignor to International Telephone and Telegraph Corporation, Nutley, N.J., a corporation of Maryland

Filed Oct. 21, 1965, Ser. No. 499,440
U.S. Cl. 340—146.1 10 Claims
Int. Cl. G08b *29/00;* G06f *11/10*

This invention relates to error correction circuits for digital recording systems and is specifically intended for magnetic tape recording systems, although it may also have applications to higher speed devices, such as magnetic drums or core memories.

In the conventional method of reading magnetic tape, the low level pulses from the reading head are passed through a preamplifier and then fed to a voltage comparator. This is a circuit, such as a Schmitt trigger circuit, which detects whether the amplitude of the pulse exceeds some arbitrary threshold level. If the threshold is exceeded, the pulse is interpreted as a "one" and the corresponding flip-flop in a data register is set, the flip-flop being reset before the time at which the next pulse could be expected. If the threshold is not exceeded, the flip-flop is not set, thus indicating a "zero." The threshold is set at about 50% of the normal amplitude of a "one."

The exact threshold value is of great importance. The higher it is set, the less likelihood of a noise spike being interpreted as a "one," but conversely, the greater the likelihood of a weak "one" being missed. On the other hand, the lower the threshold value is set, the less likelihood of a weak "one" being lost, but the greater likelihood of a noise causing an error.

It is customary with, say 7-channel magnetic tape, to assign one of the channels as a parity check on the other six. Then any single error can be detected but normally not corrected. However, there is one known method of performing error correction. This is known as "dual-threshold" detection.

In this method, the voltage comparators and flip-flops are duplicated. The output of each preamplifier is fed to two voltage comparators, one of which operates at a high threshold level and the other at a low threshold level. Normally the high one is used, thereby providing a large amount of noise immunity. However, if a parity error is found in the output of the high threshold comparator, then the other comparator's contents is examined. If the parity of this is correct, it is assumed that this is the correct character. If the parity is incorrect, then nothing can be done except to reread the tape.

It is one of the objects of the present invention to provide a correction circuit for digital recording systems which will actually correct an error and at the same time provide a large amount of noise immunity.

Another object of the invention is to provide an error correction circuit for digital recording systems which requires no substantial increase in the number of components.

Still another object of the invention is to provide an error correction circuit for digital recording systems which utilizes simple, well known components, so that the circuit may be easily constructed.

The circuit of the invention is adapted to receive and record code characters of a plurality of bits, each bit having its own channel, and the circuit operates in the following manner:

The threshold for each of the channels is initially set high to provide the large amount of noise immunity. If the initial results yield a valid parity check, they are accepted. However, if the check fails, it is probably because a "one" bit on one channel is weak and does not overcome the threshold value, thus appearing as a "zero." When this situation occurs, the threshold on each of the channels is slowly and continuously reduced until the weak bit overcomes the threshold and changes from a "zero" to a "one," thus making the parity correct and presumably correcting the error. In order to retain the information during the interval in which the threshold is being reduced, the original information is stored in a "peak holder" or voltage storing circuit.

As in any error correction scheme, it is impossible to be certain that the proper correction has been made, but with my invention the probability is very high that it has been. Since the initial threshold was set high, the error was caused by a weak "one," and almost certainly this weak "one" was larger than the noise on any of the other channels. If so, the incorrect bit will have been corrected.

The invention is illustrated in the accompanying drawings, in which.

Figures 1, 2:
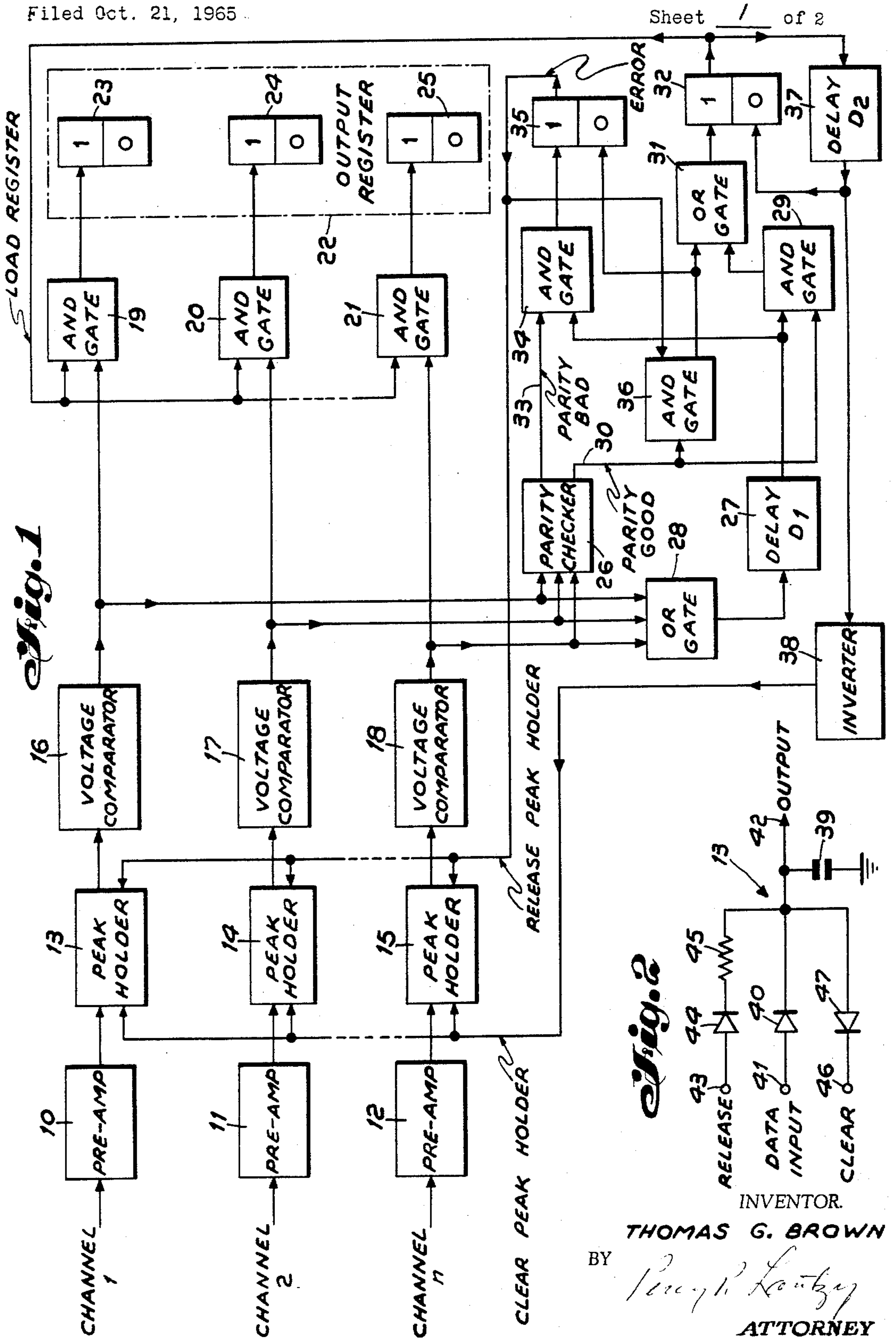
FIG. 1 is a block diagram of one form of circuit which may be used.
FIG. 2 is a circuit diagram of one form of voltage storing or peak holder circuit.

Referring now more specifically to the drawings, one form of error correction circuit is shown in the block diagram of FIG. 1. A plurality of input channels are provided, the first two, indicated as "channel 1" and "channel 2," and the last, indicated as "channel *n*," being shown. The number of channels will depend on the number of elements or bits in the code signal to be received, and since the channels are identical, it is considered unnecessary to show more than three.

Channels 1, 2, and *n* feed respectively into preamplifiers 10, 11, and 12 which amplify the signals picked up, for example, by the reading head from a magnetic tape sufficiently for use in the succeeding components of the circuit. The preamplifiers 10, 11, and 12 deliver the amplified signals respectively to the peak holder or voltage storing circuits 13, 14, and 15. The purpose of these circuits is to store the peak voltage in each bit of the signal picked up from the tape or other source, and one form of such a circuit will be described in detail later. The peak voltages stored in the peak holder circuits 13, 14, and 15 are transferred to voltage comparator circuits 16, 17, and 18. Each of these is a well known circuit which compares the incoming voltage with a fixed bias or threshold voltage and produces an output representing binary "one" only when the incoming voltage is above that of the bias. No output represents a binary "zero."

The outputs of the voltage comparators 16, 17, and 18 are delivered respectively to AND gates 19, 20, and 21, which control the passage of these output signals to a load register 22 which may comprise, for example, flip-flops 23, 24, and 25. No signals pass through the gates 19, 20, and 21 until they are enabled in a manner to be described.

Also connected to the voltage comparators 16, 17, and 18 in parallel is a parity checking circuit 26. This may be any well known type of circuit which will produce a "parity good" signal when the proper number of signal bits are present at the outputs of the several voltage comparators and a complementary "parity bad" signal when the number of signal bits at the outputs of the voltage comparators is not correct.

Since there is normally no timing information to indicate when data occurs, it is necessary to generate a signal to tell when to use the output from the comparators.

It may also be that the signals on the several channels do not come at exactly the same time, perhaps because of physical skewing of the tape from which the signals are obtained, or for other reasons. It is therefore necessary to give all the voltage comparators time to respond to the signals fed to them before delivering the signals to the load register, and, in order to do this, I provide a delay circuit $D_1$ which is connected through an OR gate 28 to the outputs of all the voltage comparators 16, 17, and 18. The delay of this circuit is arranged to allow the proper time for all the voltage comparators to respond to the incoming code signal. The first comparator to respond to an incoming signal will send its response through the OR gate 28 which will initiate the operation of the delay circuit $D_1$.

The output of the delay circuit $D_1$ is fed to one input of a two-input AND gate 29, the other input being connected to the "parity good" output 30 of the parity checker 26. When a "parity good" signal is produced by the parity checker 26, it can not pass through the AND gate 29 until that gate is enabled by the termination of the delay period of the delay circuit $D_1$. When this occurs, the output of the AND gate 29 passes through an OR gate 31 and is delivered to a flip-flop circuit 32 which is thus set to the "one" condition. The output of the "one" side of this flip-flop circuit is the signal to indicate when to use the output from the comparators and is then delivered to the second input of each of the AND gates 19, 20, and 21 which are thus enabled, so that they deliver their outputs respectively to the flip-flops 23, 24, and 25 in the load register 22.

If the proper number of code elements or bits does not appear at the outputs of the voltage comparators 16, 17, and 18, the parity checker 26 will produce a "parity bad" signal on its output 33. This output is connected to one of two inputs of an AND gate 34, the other input being connected to the output of the delay circuit $D_1$. When the delay period of the delay circuit $D_1$ terminates, the AND gate 34 will be enabled, so that it will pass the "parity bad" signal to an error flip-flop circuit 35 to shift it to the "one" condition. The output of the "one" side of this flip-flop is delivered to the peak holder circuits 13, 14, and 15 and has the effect of gradually increasing the voltages stored in these circuits in a manner which will be described later.

During this period, the AND gates 19, 20, and 21 have not been enabled because the flip-flop 32 has not been shifted to its "one" condition, and hence no signals have passed into the load register 22.

As has been stated above, the fact that the parity is not correct will in all probability be caused by a "one" signal on one of the channels 1, 2, and *n* being too weak. As the voltages in the peak holder circuits 13, 14, and 15 gradually increase, there will come a time when this weak signal has a high enough value to produce an output on its associated voltage comparator. When this occurs, the correct number of outputs will appear at the voltage comparators and the parity checker 26 will operate to produce a "parity good" signal. This signal is also delivered to the two-input AND gate 36 which has been enabled by the flip-flop 35 in the "one" condition. The output of the AND gate 36 is connected to the OR gate 31, so that the flip-flop 32 will shift to its "one" condition and the gates 19, 20, and 21 will be enabled to pass the correct signals to the load circuit 22.

In order to shift the error flip-flop 35 back to its normal "zero" condition, the output of the AND gate 36 is delivered to the "zero" side of this flip-flop so that it will be ready for the next signal.

Means is also provided to clear the peak holder circuits 13, 14, and 15 and the flip-flop 32. To this end a second delay circuit $D_2$ is provided with its input connected to the output of the "one" side of the flip-flop 32. When this flip-flop shifts to the "one" condition to deliver the signals to the load circuit 22, the delay period of the delay circuit $D_2$ is initiated. The output of the delay circuit $D_2$ is connected to the "zero" side of the flip-flop 32 and has the effect of shifting the condition of this flip-flop back to its normal "zero" condition. The output is also delivered to an inverter 38 and thence to the peak holder circuits 13, 14, and 15 to restore these circuits in a manner to be later described, so that they will be ready to receive the next code signal.

In FIG. 2 one form of a simple peak holder circuit 13 is shown. A capacitor 39 forms the main component for this circuit. One terminal of the capacitor is connected to ground, while the other is connected over a diode 40 to the output of the associated preamplifier, indicated at 41. The output 42 of the circuit is connected to the same terminal of the capacitor. The diode 40 is poled so that a voltage pulse appearing at the output of the associated preamplifier will pass through the diode to charge the capacitor at substantially the value of the incoming pulse. When the pulse decays, the diode 40 becomes back-biased and the voltage on the capacitor remains constant. The "release" terminal 43, which is connected to the output of the "one" side of the error flip-flop 35, is connected through a diode 44 and a resistor 45 to the ungrounded terminal of the capacitor 39. Normally, with the error flip-flop 35 in the "zero" condition, the voltage on terminal 43 from the "one" side of the flip-flop 35 is zero or ground and the diode 44 has no effect on the charge on the capacitor. When the error flip-flop 35 is in the "one" condition, a positive voltage, greater than any signal voltage which would appear, is applied from the flip-flop 35 over the terminal 43, the diode 44, and the resistor 45 to the capacitor. This voltage causes the charge on the capacitor, already present because of the signal, to increase gradually as current flows through the resistor 45, the diode being poled so as to permit this current flow. When the charge on a particular capacitor, produced by the signal, is not sufficient to produce an output in the associated voltage comparator because of a weak "one" in the signal and is further increased by the voltage on the terminal 43, it will eventually reach a value that will affect the associated voltage comparator, whereupon the "parity good" signal will be produced by the parity checker 26 and the erroneous signal will have been corrected, as described above.

In order to clear the circuit to prepare it for the next code signal, the clear terminal 46 is connected to the ungrounded terminal of the capacitor 39 through a diode 47. The terminal 46 is also connected to the inverter 38, which normally has a potential higher than that applied to terminal 43, so that the diode 47 is back-biased and has no effect on the charge on the capacitor 39. However, when the delay period of delay circuit $D_2$ terminates, the inverter 38 will provide a ground potential at the terminal. The capacitor will then discharge through the diode and will therefore be ready for the next signal.

Figures 3, 4, 5, 6:
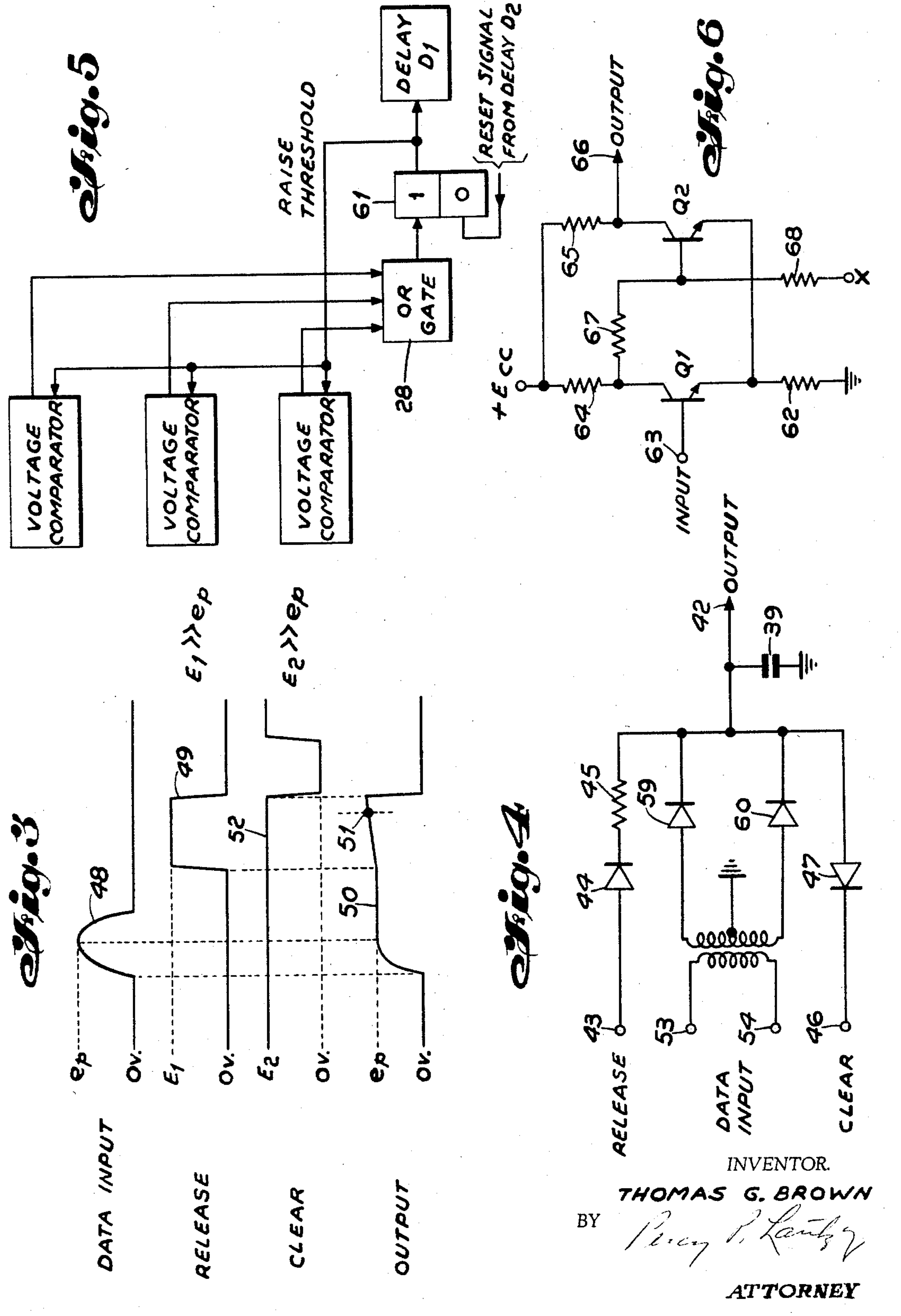
FIG. 3 is a representation of waveforms useful in describing the peak holder or voltage storing circuit.
FIG. 4 is a diagram of a modified form of peak holder or voltage storing circuit arranged for bipolar data input signals.
FIG. 5 is a block diagram of a modified form of a portion of an error correction circuit using a different type of voltage comparator circuit.
FIG. 6 is a schematic representation of a transistorized voltage comparator circuit which might be used with the circuit of FIG. 6.

In FIG. 3 a series of typical waveforms is shown illustrating the potentials at different times on different terminals of the peak holder circuit of FIG. 2. Waveform 48 indicates the data input pulse which is delivered from the preamplifier associated with the peak holder circuit to terminal 41. The pulse rises from ground potential, indicated as $O_v$, to a maximum signal potential of $e_p$ and falls again back to ground potential at the end of the pulse. When the parity checker 26 produces a "parity bad" signal, a potential of $E_1$, which is greater than the maximum potential $e_p$ of the pulse, is applied to the terminal 43 from the error flip-flop 35 after the delay circuit $D_1$ has had time to operate. This is indicated in waveform 49. The voltage $E_1$ causes a current to flow through resistor 45 which has the effect of gradually increasing the charge on the capacitor 39. Waveform 50 indicates the original charge of voltage $e_p$ in the capacitor and shows the charge increasing as it approaches the voltage $E_1$. The charge will probably never reach $E_1$ because, as soon as the charge is sufficient to override the threshold bias of the associated voltage comparator, the "parity good" signal will be produced by the parity checker 26, the AND gate 36 will be enabled, the error flip-flop 35 will shift to the "zero" condition, and the voltage $E_1$ will be removed from the terminal 43 of the peak holder circuit. This may be assumed to have occurred at the point 51 of the waveform 50. The flip-flop 32 also shifts to its "one" condition at this time to cause the outputs of the voltage comparators to deliver the information to the load circuit 22.

During this time, a potential of $E_2$, which is higher than the potential $e_p$, has been applied to the clear terminal 46 of the peak holder circuit by the inverter 38. No effect is produced on the capacitor 39 by this potential because of the diode 47. However, the shifting of the flip-flop circuit 32 to the "one" condition initiates the delay circuit $D_2$ and the termination of this delay will operate through the inverter 38 to change the potential $E_2$ on the terminal 46 to ground, thus permitting the capacitor 39 to discharge through the diode 47. This shift in voltage for the clear action is indicated in waveform 52.

It will be understood that means is provided for initially setting the flip-flops in their "zero" condition, but this means has not been shown in order to simplify the drawings.

In some instances the data input from the preamplifiers will be bipolar with alternative pulses positive and the others negative. In such a case the peak holder circuit of FIG. 2 may be altered to that shown in FIG. 4. Here the input is applied to two terminals 53 and 54 which are connected to the primary winding 55 of a transformer 56, the center tap 57 of the secondary winding 58 being grounded. The ends of the secondary winding 58 are connected to the capacitor 39 through two diodes 59 and 60 which are poled in the same direction to permit the capacitor to be charged. The combination of the transformer and the two diodes rectifies the input signal, converting it to a unipolar signal. The other components of the circuit are the same as shown in FIG. 2.

In the circuit thus far described, the change in the effective threshold value of the voltage comparator is effected by raising the voltage charge on the capacitors of the peak holder circuits. However, the effective shift in threshold may be accomplished by changing the bias voltage of the voltage comparators, in which case the output from the error flip-flop 35 will lead to the voltage comparators instead of the peak holder circuits to effect a gradual lowering of the bias potential in a manner which will be understood. The overall effect would be identical, and engineering considerations would determine which arrangement would be used.

In the foregoing explanation of the peak holder circuit, some idealizing assumptions were made, namely that there would be negligible forward voltage drop through the diodes, that the leakage current through reverse-biased diodes was negligible, and that the input impedance of the voltage comparator driven by the peak holder circuit was so high as not to affect the charge on the capacitor.

The first assumption regarding the forward voltage drop of a diode is only significant in the case of the diode 40 of FIG. 2. Because of the drop in this diode, the amplitude of the input signal will always be slightly less than the peak input voltage $e_p$. This shift can be taken into account in setting the reference threshold voltage in the voltage comparators. For example, if it is desired to set the threshold to correspond to a 2.0 volt level on the pulse, and if the diode introduces a 0.3 volt reduction in the signal, then the reference threshold would be set at 1.7 volts. The only error will be the amount by which the forward voltage drop varies, not its absolute value. The variation can be held to a negligible amount.

The second assumption regarding the negligible leakage current through a reverse-biased diode can easily be met with the diodes available today.

The third assumption regarding the input impedance of the voltage comparator may present a problem. It might be necessary to solve this by inserting a high-input-impedance buffer stage between the peak holder and the associated voltage comparator to prevent the peak holder from being loaded down, thus causing the charge on the capacitor to leak off.

There is one special problem that requires discussion. That involves the case where a character contains only a single bit which is "one" and which becomes weak enough to fail to exceed the initial high voltage threshold of the associated voltage comparator. Therefore the character will be missed completely. It might be thought that the solution to this problem would be first to examine the signals by using a low threshold, and then, if something is sensed, to switch to a higher threshold. This would solve the problem posed, but would create another one in its place.

Consider the case in which there is no character but a noise spike occurs on one of the channels. This would be taken to indicate the occurrence of a character. According to my invention, the signals would be examined using a high threshold, and all "zeros" would be found. Since this yields an incorrect parity, the threshold would be reduced, the noise would be accepted as a "one," and a nonexistent character would be produced.

This same problem exists regardless of which of the various techniques, such as single-fixed threshold, dual-fixed threshold, or the arrangement of the invention already described, is used. There is only one solution which completely eliminates this problem. That is to exclude from the set of permissible codes those which contain only a single bit equal to "one." For a 7-bit code, there are a total of 64 characters which have an odd parity, and there are 7 characters which contain a single "one." Excluding them would reduce the number of permissible characters only slightly. However, this often would be an objectionable restriction, since in most applications the storage device is acting as peripheral equipment for some other equipment, such as a computer, which has no such restriction of the permissible characters.

If a restriction on the permissible characters is excluded, then there is no way out of the dilemma. Based on engineering considerations regarding the relative probabilities of the two types of errors and the relative difficulties caused by them, a choice must be made. If the echoice is to use the high threshold to sense first for the occurrence of a character, then the arrangements of the invention already described can be used. On the other hand, if the choice is to use a low threshold initially for sensing for the presence of a character, the arrangement already described must be modified. The modification is a slight one, involving a small amount of additional equipment, as shown in FIG. 5. In this arrangement, there is normally a low bias on the voltage comparator circuits to provide a low voltage threshold for sensing for the presence of a character. Instead of having the output of the OR gate 28 go directly to the delay circuit $D_1$, as in FIG. 1, a flip-flop 61 is connected between the OR gate and the delay circuit and is arranged to be shifted to its "one" condition by the output of the OR gate. The output of the "one" side of the flip-flop 61 is provided with a "raise threshold" signal, which has a higher voltage than the normal bias voltage of the voltage comparator circuits and is applied to the voltage comparator circuits in such a manner as to raise the bias voltage and thus raise the threshold potential. Thus, the voltage comparator circuits normally operate at a low threshold, but when the flip-flop 61 is in the "one" condition, the threshold is raised. In this manner the sensing for the presence of a character is done at a low threshold, while the actual reading of the character is done at a high threshold. When the reading is completed, the clear pulse from the delay circuit $D_2$ clears the flip-flop and thus lowers the threshold again.

The details of the modification to the voltage comparator circuit to permit raising the threshold will depend on exactly what one of many well known voltage comparator circuits is used. In FIG. 6 is shown one form of transistorized emitter-coupled multivibrator which might be used as a voltage comparator. The circuit includes two transistors $Q_1$ and $Q_2$, shown as NPN transistors. The emitters of the two transistors are connected together and to ground through a resistor 62. The input from the associated peak holder circuit is applied to the terminal 63 which is connected to the base of transistor $Q_1$. The collectors of transistors $Q_1$ and $Q_2$ are connected to the positive source of potential $E_{cc}$, through respective resistors 64 and 65, while the collector of transistor $Q_2$ is connected to the output 66 of the circuit. The base of transistor $Q_2$ is connected to the collector of transistor $Q_1$ over a resistor 67. The bias potential is supplied to the base of transistor $Q_2$ over a resistor 68, the bias terminal being designated by the reference character X.

If terminal X is supplied with a fixed voltage less than a predetermined threshold level, transistor $Q_2$ will be conducting and $Q_1$ will be nonconducting. If the voltage on terminal X exceeds that threshold level of voltage, transistor $Q_1$ will be made to conduct and transistor $Q_2$ will be rendered nonconducting. Thus the threshold level can be raised by raising the voltage at terminal X. Since terminal X is connected to the "one" side of flip-flop 61 of FIG. 5, the voltage at the terminal may be caused to rise when the flip-flop shifts from its "zero" condition to its "one" condition. The circuit can thus sense the presence of an incoming character signal at low threshold voltage and then read the character as described in connection with FIG. 1.

It will be seen from the above description that I have provided an error correction system for digital recording equipment which has a high degree of noise immunity while at the same time correcting a large percentage of errors arising through transmission. The fact that the threshold of the voltage comparators is effectively gradually lowered, when the parity checker detects an error, permits the circuit to respond as soon as the weak bit can overcome the threshold. This usually occurs before the threshold has been lowered to any great extent. Thus there is little probability of noise affecting the circuit.

While the invention has been described in connection with specific circuit arrangements, I do not wish to limit it to these specific arrangements except by the limitations contained in the appended claims.

What I desire to claim and secure by Letters Patent is:

1. An error correction circuit for digital recording systems comprising:

(a) a plurality of independent receiving means, one for each bit of a multibit code signal to be received;

(b) a plurality of voltage storing means connected respectively to said receiving means and each adapted to maintain the peak voltage of its received signal for a period of time;

(c) a plurality of voltage comparators, one for each storing means and connected respectively thereto and arranged to respond when the voltage of the signal stored in the associated storing means exceeds a predetermined threshold value;

(d) parity checking means connected to said voltage comparators and adapted to produce a "parity good" signal when there is a correct number of code bits in the outputs of said voltage comparators and to produce a "parity bad" signal when there is an incorrect number of code bits in the outputs of said voltage comparators;

(e) individual output means, one for each of said voltage comparators;

(f) gating means between said voltage comparators and said output means and connected to said parity checking means for delivering the signals on the outputs of said voltage comparators to said output means in response to a "parity good" signal from said parity checking means;

(g) means connected to said parity checking means and responsive to a "parity bad" signal therefrom for gradually reducing the effective threshold value of said voltage comparators, and (h) means thereafter responsive to a "parity good" signal from said parity checking means for disabling said threshold-value-reducing means and for enabling said gating means.

2. An error correction circuit, as defined in claim 1, in which the means for gradually reducing the effective threshold value of the voltage comparators comprises:

(a) delay means connected to said voltage comparators and adapted to have its delay period initiated by an output from any one of said comparators; and (b) second gating means connected to said delay means and to the parity checking means and responsive to the termination of said delay period for initiating the operation of said threshold-value-reducing means.

3. An error correction circuit, as defined in claim 2, further comprising:

(a) clearing means for the voltage storing means; and (b) means alternatively responsive to the simultaneous termination of the delay period of the delay means and the production of a "parity good" signal from the parity checking means, or to the "parity good" signal after the operation of the means for gradually reducing the effective threshold value of the voltage comparators, for operating said clearing means.

4. An error correction circuit, as defined in claim 3, in which the clearing means for the voltage storing means comprises:

(a) second delay means having a predetermined delay period;

(b) means for initiating the operation of said second delay means when the gating means is operated for delivering the signals from the voltage comparators to the output means; and (c) means responsive to the termination of the delay period of said second delay means for clearing the stored voltage in the voltage storing means.

5. An error correction circuit, as defined in claim 4, in which each voltage storing means comprises a capacitor and the means for reducing the effective threshold value of the voltage comparators comprises means responsive to the termination of the delay period of the first delay means for gradually raising the charge on the capacitor of each storing means, and the means for clearing said voltage storing means comprises means responsive to the termination of the delay of the second delay means for discharging the capacitor of each said storing means.

6. An error correction circuit, as defined in claim 1, in which each voltage storing means comprises a capacitor and the means for gradually reducing the effective threshold value of the voltage comparators comprises means for gradually increasing the charges on the capacitors of said voltage storing means over the charges applied from the receiving means by the received signals.

7. An error correction circuit, as defined in claim 1, in which the voltage comparators comprise means for normally maintaining a bias voltage to fix threshold value of said comparators, and the means for reducing the effective threshold value comprises means for gradually reducing said bias voltage.

8. An error correction circuit for digital recording systems comprising:

(a) a plurality of indepedent receiving means, one for each bit of a multibit code signal to be received;

(b) a plurality of voltage storing means, one for each receiving means, connected respectively to said receiving means and each comprising a capacitor for storing the voltage of a signal bit received by the associated receiving means;

(c) a plurality of voltage comparators, one for each storing means, and connected respectively thereto and arranged to respond when the voltage of the signal stored in the capacitor of the associated storing means exceeds a predetermined value;

(d) parity checking means connected to said voltage comparators and adapted to produce a "parity good" signal when there is a correct number of code bits in the outputs of said voltage comparators and to produce a "parity bad" signal when there is an incorrect number of code bits in the outputs of said voltage comparators;

(e) first delay means connected to the outputs of all said voltage comparators and arranged to have a predetermined delay period initiated when an output appears in any of said voltage comparators;

(f) a plurality of individual output means, one for each voltage comparator;

(g) individual transfer gating means, one for each voltage comparator, connected respectively between said comparators and said output means;

(h) enabling means connected to said first delay means and to said parity checking means and responsive to a "parity good" signal and the termination of the delay in said first delay means for enabling said individual transfer gating means for passing signals from said voltage comparators to said output means;

(i) means also connected to said first delay means and to said parity checking means and responsive to a "parity bad" signal from said parity checking means and the termination of the delay in said first delay means for causing the charges on the capacitors of said voltage storing means to increase gradually;

(j) second delay means connected to said enabling means and arranged to have a predetermined delay period initiated when an output appears on said enabling means; and (k) means responsive to the termination of the delay period in said second delay means for discharging the capacitors in said voltage storing means.

9. An error correction circuit, as defined in claim 8, in which the enabling means for enabling the individaul transfer gating means for passing signals from the voltage comparators to the output means comprises:

(a) a flip-flop circuit;

(b) an AND gate having two inputs, one connected to the "parity good" output of the parity checker and the other connected to the output of the first delay means, said AND gate having its output connected to the "one" side of said flip-flop circuit, whereby the operation of said AND gate will cause said flip-flop circuit to shift it its "one" condition; and (c) means for enabling said transfer gating means when said flip-flop circuit is in its "one" condition.

10. An error correction circuit for digital recording systems comprising:

(a) a plurality of independent receiving means, one for each bit of a multibit code signal to be received;

(b) a plurality of voltage storing means connected respectively to said receiving means and each adapted to maintain the peak voltage of its received signal for a period of time;

(c) a plurality of voltage comparators, one for each storing means and connected respectively thereto and arranged to respond when the voltage of the signal stored in the associated storing means exceeds a predetermined threshold value;

(d) parity checking means connected to said voltage comparators and having two outputs, and adapted to produce a "parity good" signal on one output when there is a correct number of code bits in the outputs of said voltage comparators and to produce a "parity bad" signal on the other output when there is an incorrect number of bits in the outputs of said voltage comparators;

(e) individual output means, one for each voltage comparator;

(f) transfer gating means connected respectively between said voltage comparators and said individual output means;

(g) first delay means having a predetermined time delay;

(h) means responsive to an output from any one of said voltage comparators for initiating the operation of said first delay means;

(i) a transfer flip-flop circuit adapted to enable said transfer gating means when said transfer flip-flop circuit is in its "one" condition;

(j) a first AND gate having its output coupled to the "one" side of said transfer flip-flop circuit, so as to shift said transfer flip-flop circuit to its "one" condition when said first AND gate operates, and having two inputs, one connected to the output of said first delay circuit and the other connected to the "parity good" output of said parity checking means;

(k) an error flip-flop circuit;

(l) means connected to the "one" side of said error flip-flop circuit for causing an effective gradual lowering of the threshold value of said voltage comparators when said error flip-flop circuit is in its "one" condition;

(m) a second AND gate having its output connected to the "one" side of said error flip-flop circuit and adapted to shift said flip-flop circuit to its "one" condition when said second AND gate is operated, said second AND gate having two inputs, one connected to the "parity bad" output of said parity checking circuit and the other connected to the output of said first delay means, whereby the simultaneous appearance of a "parity bad" signal and the termination of the delay period of said first delay circuit will operate said second AND gate;

(n) a third AND gate having its output coupled to the "one" side of said transfer flip-flop circuit and to the "zero" side of said error flip-flop circuit, whereby when said third AND gate is operated, said transfer flip-flop circuit is shifted to its "one" condition and said error flip-flop circuit is shifted to its "zero" condition, and having two inputs, one being connected to the output of the "one" side of said error flip-flop circuit and the other being connected to the "parity good" output of said parity checking means;

(o) a second delay circuit having a predetermined delay period, the input of said circuit being connected to the output of the "one" side of said transfer flip-flop and the output being connected to the "zero" side of said transfer flip-flop; and (p) means also connected to the output of said second delay circuit for clearing said voltage storing means upon the termination of the delay of said second delay circuit.

References Cited

UNITED STATES PATENTS

| | | | |
|---|---|---|---|
| 2,991,372 | 7/1961 | Blocher | 307—235 X |
| 3,098,994 | 7/1963 | Brown | 340—146.1 |
| 3,214,700 | 10/1965 | Hook | 328—116 X |

FOREIGN PATENTS

| | | |
|---|---|---|
| 561,797 | 8/1958 | Canada. |

MALCOLM A. MORRISON, *Primary Examiner.*

R. S. DILDINE, Jr., *Assistant Examiner.*

U.S. Cl. X.R.

235—153; 307—235; 328—116; 340—415